(12) United States Patent
James et al.

(10) Patent No.: US 7,900,458 B2
(45) Date of Patent: Mar. 8, 2011

(54) TURBINE AIRFOILS WITH NEAR SURFACE COOLING PASSAGES AND METHOD OF MAKING SAME

(75) Inventors: Allister W. James, Orlando, FL (US); Anand A. Kulkarni, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 788 days.

(21) Appl. No.: 11/807,389

(22) Filed: May 29, 2007

(65) Prior Publication Data
US 2008/0298975 A1  Dec. 4, 2008

(51) Int. Cl.
*B31D 3/00* (2006.01)
(52) U.S. Cl. .............. 60/752; 60/754; 415/115; 415/200
(58) Field of Classification Search .............. 60/752, 60/754; 415/115, 200, 173.1, 116; 416/96 R, 416/97 R, 97 A, 229 A, 241 R, 241 B
See application file for complete search history.

(56) References Cited

U.S. PATENT DOCUMENTS

| | | | |
|---|---|---|---|
| 3,844,727 A * | 10/1974 | Copley et al. | 428/596 |
| 4,884,820 A * | 12/1989 | Jackson et al. | 277/415 |
| 5,249,357 A * | 10/1993 | Holmes et al. | 29/890.01 |
| 6,106,959 A | 8/2000 | Vance et al. | |
| 6,214,248 B1 | 4/2001 | Browning et al. | |
| 6,231,998 B1 | 5/2001 | Bowker et al. | |
| 6,321,449 B2 | 11/2001 | Zhao et al. | |
| 6,638,639 B1 | 10/2003 | Burke et al. | |
| 6,670,046 B1 | 12/2003 | Xia | |
| 6,716,539 B2 | 4/2004 | Subramanian | |
| 6,921,014 B2 * | 7/2005 | Hasz et al. | 228/122.1 |
| 6,933,060 B2 | 8/2005 | Subramanian et al. | |

OTHER PUBLICATIONS

James R. Dobbs, Jeffrey A. Graves and Sergey Meshkov, Advanced Airfoil Fabrication, Superalloys 1996, The Minerals, Metals & Materials Society, 1996, pp. 523-529.

* cited by examiner

*Primary Examiner* — William H Rodriguez
*Assistant Examiner* — Vikansha S Dwivedi

(57) ABSTRACT

The present invention provides near-surface cooled airfoils that can be made with near-surface cooling passages that are completely free of any leachable or otherwise sacrificial material in the recessed portion of the outer surface of the core. The turbine airfoil comprises a metallic core or substrate having an outer surface and one or a plurality of recessed portions of the outer surface; an intermediate metallic skin or foil having a back surface and a top surface, the back surface of the intermediate skin being bonded to the outer surface of the core such that the recessed portion(s) is sufficiently enclosed so as to form at least one or more near-surface cooling passages or pathways; and at least one or more metallic coatings of a high temperature-resistant metallic material deposited on a top surface of the intermediate skin.

20 Claims, 1 Drawing Sheet

TURBINE AIRFOILS WITH NEAR SURFACE COOLING PASSAGES AND METHOD OF MAKING SAME

FIELD OF THE INVENTION

The present invention relates to turbine airfoils (e.g., blades, vanes, shrouds, combustors and ducts of a turbine engine), in particular, turbine airfoils that include one or more near surface cooling passages, and more particularly, to methods of making such turbine airfoils.

BACKGROUND OF THE INVENTION

Gas turbine engines operate at high temperatures in order to increase their efficiency. Various advancements have been employed to enable the components (e.g., airfoils) of such engines to operate for longer periods of time at such high temperature. Airfoils employed in modern, high efficiency power generation combustion turbine engines rely on high quality materials such as single crystal alloys and precise control of the part's internal and external dimensions. In addition to the use of high temperature resistant super alloys, various airfoils have been designed to include internal cooling systems. One such internal cooling system is the use of cooling passages located inside and near the surface of the airfoil.

A number of techniques have been employed to provide such turbine airfoils with near surface cooling passages. For example, U.S. Pat. No. 6,638,639 discloses high efficiency, thin-walled turbine components such as turbine blade airfoils comprising a superalloy substrate with cooling channels covered by a thin super alloy skin. The thin skin is bonded to the inner spar structure of a turbine blade airfoil. U.S. Pat. No. 6,321,449 discloses a method of forming an internal channel within an article, such as a cooling channel in an air-cooled blade, vane, shroud, combustor or duct of a gas turbine engine. The method generally entails forming a substrate to have a groove recessed in its surface. A sacrificial material is deposited in the groove to form a filler that can be preferentially removed from the groove. A permanent layer is deposited on the surface of the substrate and over the filler, after which the filler is removed from the groove to yield the desired channel in the substrate beneath the permanent layer.

The present invention is an improvement over known techniques for providing turbine airfoils with near surface cooling capability.

SUMMARY-OF THE INVENTION

In one aspect, the present invention provides a method of making a turbine airfoil such as, for example, a blade, vane, shroud, combustor or duct of a turbine engine, where the turbine airfoil comprises at least one thin-wall or near-surface cooling passage or pathway. The method comprises providing a metallic core or substrate having an outer surface and one or a plurality of recessed portions of the outer surface; providing an intermediate metallic skin or foil having a back surface and a top surface; bonding the back surface of the intermediate skin to the outer surface of the core such that the recessed portion(s) is are at least partially, mostly or otherwise sufficiently enclosed so as to form at least one or more near-surface cooling passages or pathways; and depositing at least one or more metallic coatings of a high temperature-resistant metallic material on a top surface of the intermediate skin. As used herein, the term metallic material refers to elemental metals, metal alloys or intermetallic compounds but not a ceramic material such as, for example, a conventional thermal barrier coating like that disclosed in U.S. Pat. Nos. 6,106,959; 6,231,998; 6,670,046; 6,716,539; and 6,933,060.

The core being provided can include a plurality of spaced-apart pedestals that extend out from the outer surface of the core and define the recessed portion therebetween. The pedestals can each have a top area, and the near surface cooling passage is formed by bonding the top areas of the pedestals to a corresponding area of the back surface of the intermediate skin such that the skin extends over the recessed portion so as to form the near-surface cooling passage. The core being provided can also be formed with a plurality of channels having a desired width and depth into the outer surface of the core, with these channels defining the recessed portion. Areas of the outer surface of the core located on either side of each of these channels can be bonded to corresponding areas of the back surface of the intermediate skin such that the skin extends over the channels so as to form the near-surface cooling passage.

It can be desirable for a plurality of intermediate skins to be provided, where side edges of the intermediate skins are positioned side-by-side and adjacent one another.

In one embodiment of the present method, the bonding can comprise positioning the back surface of the intermediate skin and the outer surface of the core opposite to one another; and contacting a portion of the back surface of the intermediate skin and a portion of the outer surface of the core so as to form contacting surfaces. In this way, at least a portion of the contacting surfaces can be bonded together.

When diffusion bonding is used, the intermediate skin being provided is thick enough to withstand the isostatic or other pressures needed to diffusion bond the back surface of the skin to the outer surface of the core without the skin deforming into the recessed portion of the core and significantly reducing the cross-sectional area of the cooling passage. At the same time, the intermediate skin being provided is not thick enough to survive 24,000 hours at the maximum operating temperature of the turbine airfoil without the metallic coating.

When the outer surface of the core being provided has one or more simple two-dimensional or complex three-dimensional curved contours, the method can further comprise deforming the intermediate skin so as to conform to the one or more curved contours of the core (i.e., so that the back surface of the skin contacts the outer surface of the core), and then the bonding is performed. To facilitate the bonding, it can be desirable for the intermediate skin to be deformed so as to conform to the surface contour of the core such that a portion of the back surface of the intermediate skin intimately contacts a portion of the outer surface of the core.

The present method can further comprise depositing a thermal barrier coating on a top surface of the metallic coating. The present method can also further comprise forming one or more auxiliary cooling passages (e.g., holes) through the intermediate skin, the metallic coating and the optional thermal barrier, and/or through the core, at locations where relatively cooler air inside the turbine airfoil can come out and pass over to cool the exterior of the turbine airfoil.

In another aspect, the present invention provides a turbine airfoil such as, for example, a blade, vane, shroud, combustor or duct of a turbine engine, with thin-wall or near-surface cooling passages or pathways. The turbine airfoil comprises a metallic core or substrate having an outer surface and one or a plurality of recessed portions of the outer surface; an intermediate metallic skin or foil having a back surface and a top surface, the back surface of the intermediate skin being bonded to the outer surface of the core such that the recessed portion(s) is at least partially, mostly or otherwise sufficiently enclosed so as to form at least one or more near-surface cooling passages or pathways; and at least one or more metallic coatings of a high temperature-resistant metallic material deposited on a top surface of the intermediate skin.

The entire or at least part of the core can be less resistant to oxidation and/or creep than at least the intermediate skin, the metallic coating or both. In particular, the core can comprise a material that is less resistant to oxidation and/or creep than the material of at least the intermediate skin, the metallic coating or both. In addition, all or a portion of the core can comprise one or more materials that individually or together exhibit a higher tensile strength than at least one of the materials used to make the intermediate skin and of the materials used to make the metallic coating.

The use of the metallic coating can be particularly important, when the intermediate skin is not thick enough to survive, without the metallic coating, for at least a commercially acceptable number of hours (e.g., 24,000 hours) at a maximum operating temperature of the turbine airfoil. When the back surface of the skin is diffusion bonded to the outer surface of the core, the intermediate skin is thick enough to withstand the isostatic or other pressures needed to perform such bonding, without the skin deforming into the recessed portion(s) of the core and significantly reducing the cross-sectional area of the near-surface cooling passage(s). In addition, when the outer surface of the core has simple two-dimensional or complex three-dimensional curved contours, it can be preferable for the intermediate skin to be sufficiently thin and ductile that the skin can be deformed so as to conform to the curved contours of the core (i.e., so that the back surface of the skin intimately or otherwise sufficiently contacts the outer surface of the core), such that the intermediate skin can be bonded to the core so as to at least partially, mostly or otherwise sufficiently enclose the recessed portion(s) and form the corresponding near-surface cooling passage(s). It can be desirable for the intermediate skin to be made of a high temperature and corrosion resistant metallic material. It can also be desirable for the intermediate skin to have a thickness in the range of from at least about 0.05 mm (50 microns) to about 1 mm (1000 microns), and all ranges subsumed therein. For example, the intermediate skin can have a preferred thickness in the range of 0.2 mm to about 0.5 mm.

It can also be desirable for a thermal barrier coating to be deposited on a top surface of the metallic coating. In addition, one or more auxiliary cooling passages (e.g., holes) can be formed through the intermediate skin, the metallic coating and the optional thermal barrier at locations where relatively cooler air inside near-surface cooling passages can come out and pass over to cool the exterior of the turbine airfoil. It can be desirable for one or more such auxiliary cooling passages to be formed through the core at locations where relatively cooler air inside the core of the turbine airfoil can come out and pass over to cool the exterior of the turbine airfoil.

Because the present airfoil uses an intermediate skin, before the metallic coating is applied, the near-surface cooling passages can be made without using any leachable or otherwise sacrificial material (i.e., the cooling passages can be free of any sacrificial material) in the recessed portion(s) of the outer surface of the core.

DETAILED DESCRIPTION

Figure 1:
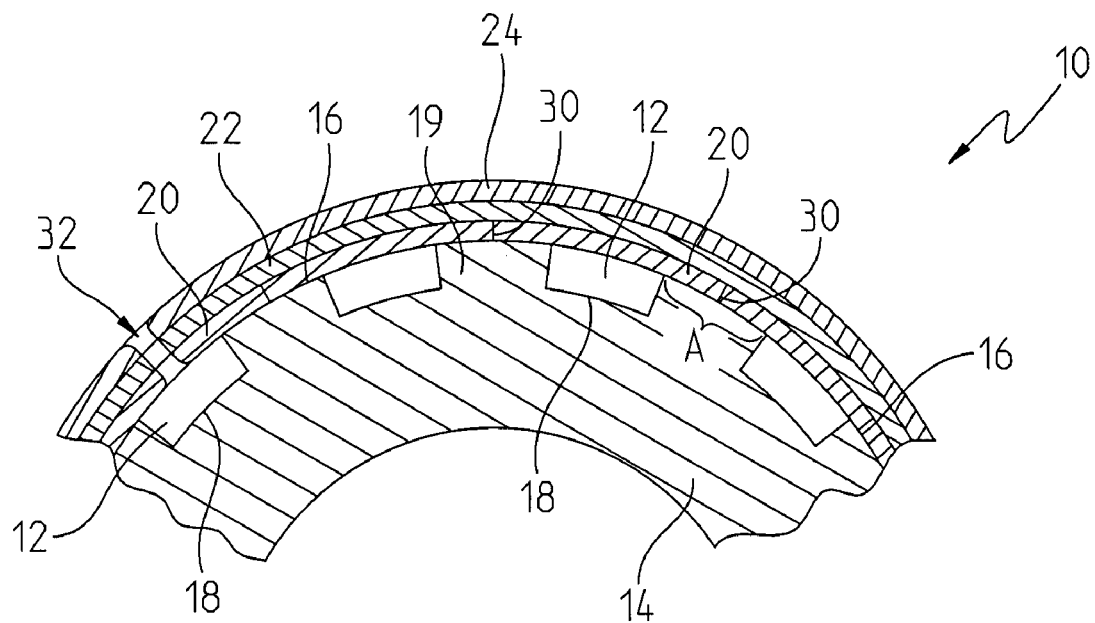
FIG. 1 is a partial cross-sectional view of a turbine airfoil with near-surface cooling passages in accordance with an embodiment of the present invention.
Figure 2:
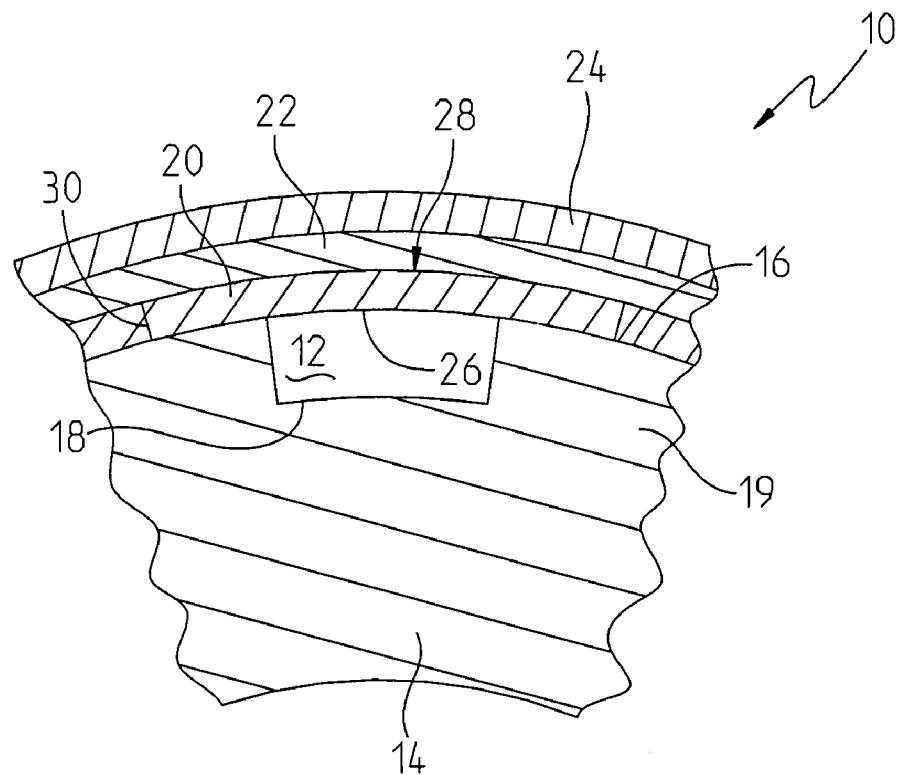
FIG. 2 is an enlarged portion of the partial cross-sectional view of FIG. 1.

Referring to FIGS. 1 and 2, a turbine airfoil 10 in accordance with one embodiment of the present invention includes a plurality of thin-wall or near-surface cooling passages or pathways 12. The airfoil 10 can, for example, be a blade, vane, shroud, combustor or duct for a liquid propellant (e.g., gasoline, jet fuel, etc.) fueled turbine engine. The airfoil 10 comprises a metallic core or substrate 14 (e.g., a spar) having an outer surface 16, and a plurality of recessed portions 18 machined, cast or otherwise formed in the surface 16 of the core 14. Each pair of adjacent recessed portions 18 define therebetween a raised portion 19 of the core 14. Each raised portion 19 defines an area A of the outer surface 16 of the core 14. A preformed intermediate metallic skin or foil 20 is disposed over the recessed portions 18 so as to form the near surface cooling passages 12. At least one or more metallic coatings 22 of a high temperature-resistant metallic material (i.e., elemental metals, metal alloys or intermetallic compounds) are deposited on the skin 20 using conventional techniques. An optional thermal barrier coating 24 can be deposited on the metallic coating 22 using conventional techniques.

The intermediate metallic skin 20 has a back surface 26 and a top surface 28. A plurality of areas of the back surface 26 of the intermediate skin 20 are each bonded to a plurality of the corresponding areas A of the core outer surface 16 on the raised portions 19 of core 14 such that the recessed portions 18 are sufficiently enclosed so as to form the near-surface cooling passages 12. The recessed portions 18 can be in the form of straight, curved or serpentine channels or grooves that are formed (e.g., machined, cast, etc.) to a desired width and depth into the outer surface 16. It can be desirable for a pattern of such channels to be formed, and it can be preferable for the channels to be interconnected. The areas A of the outer surface 16 of the core 14 located on the raised portions 19 and the corresponding areas of the back surface 26 of the intermediate skin 20 can be bonded together such that the skin 20 extends over the channel 18 to define the corresponding near-surface cooling passage 12. It may be desirable to use a single intermediate skin 20 that is dimensioned so as to extend over all of the channels 18. Alternatively, it may be advantageous to use a plurality of intermediate skins 20 that are each positioned so as to extend over a portion or all of one or more channels 18. It can be preferable for the skins 20 to be disposed side-by-side along adjacent or contacting side edges 30. The use of a plurality of such side-by-side positioned intermediate skins 20 can be particularly desirable, when the outer surface of the core 14 has curved contours.

When outer surface 16 of the core 24 has a simple two-dimensional or complex three-dimensional curved contour, it is desirable for the one intermediate skin 20, or multiple side-by-side intermediate skins 20, to be sufficiently thin and ductile to be readily deformed so as to conform to the curved contours of the core 14 (i.e., so that the back surface 26 of the skin 20 intimately contacts the outer surface 16 of the core 14), such that the intermediate skin 20 can be bonded to the core 14 so as to at least partially, mostly or otherwise sufficiently enclose the recessed portions 18 and form the cooling passages 12. A plurality of smaller side-by-side skins 20, which combined have the surface area desired for covering the outer surface 16 of the core 24, can be easier to deform so as to conform to the curved contours of the core 14 than a single skin 20 having the same desired surface area. The one or more skins 20 used can also be heated so as to be more readily deformable.

The cooling passages 12 are connected together by at least one inlet opening and at least one outlet opening, and preferably a plurality of inlet and outlet openings, according to conventional practice, so as to allow the flow of a cooling medium therethrough.

Instead of forming channels 18 in the outer surface 16 of the core 14 to form the raised portions 19, spaced-apart pedestals can be formed so as to extend out from the outer surface 16 of the core 14 and define recessed portions 18 therebetween. Therefore, for the purposes of this description, the reference number 19 can be used to describe the pedestals as well as the raised portions. These pedestals 19 can be formed, for example, by removing (e.g., machining) or forming (e.g., casting) areas of the outer surface, corresponding to the desired near surface cooling passages, down to a desired depth and/or by attaching the pedestals at desired locations on the outer surface of the core. These pedestals can have any suitable shape (e.g., spaced-apart posts or pins, straight or serpentine ribs, ridges or fins, etc.), with tops having a corresponding surface area or profile. For example, these pedestal tops can have areas that are circular, oval, rectangular (e.g., with straight, curved or serpentine parallel side edges) or a combination thereof. An example of post or pin shaped pedestals can be found in U.S. Pat. No. 6,638,639, which has previously been incorporated by reference herein. The top areas of these pedestals can form at least part, if not all, of the outer surface of the core. The top areas of the pedestals can be bonded to a corresponding area of the back surface of the intermediate skin such that the skin extends over the recessed portion(s) and forms the corresponding near-surface cooling passage(s).

The bonding of the intermediate skin 20 to the core 14 can be accomplished by positioning the back surface 26 of the intermediate skin 20 and the outer surface 16 of the core 14 opposite to or facing one another. Opposing areas A of the back surface 26 of the intermediate skin 20 and of the outer surface 16 of the core 14 can be adjacent to and preferably in contact with each other, depending on the bonding technique used. These opposing surfaces 16 and 26 can be bonded together using conventional techniques such as, for example, transient liquid phase bonding, diffusion bonding, and the use of high temperature brazing foils and, possibly, pastes disposed therebetween. With transient liquid phase bonding and diffusion bonding, it is desirable for the back surface 26 of the intermediate skin 20 to be in contact with corresponding areas of the outer surface 16 of the core 14 (e.g., areas A of the outer surface 16 of the core 14 on opposite sides of the channels 18, or top areas of the spaced-apart pedestals), before the opposing surfaces 16 and 26 are bonded together. With high temperature brazing, a brazing material (e.g., in foil or paste form) is sandwiched between the intermediate skin 20 and the core 14, so the opposing surfaces 26 and 16 of the skin 20 and core 14 are separated by the brazing material. It is desirable to maintain the surface cleanliness and fit-up (i.e., maximizing the surface area of actual contact) between the opposing surfaces 16 and 26 to be bonded.

The one or more metallic coatings 22 can be deposited so as to contact directly, or indirectly (e.g., through an intermediate layer, not shown), the top surface 28 of the intermediate skin 20 using a spray deposition or other coating technique such as, for example, electron-beam physical vapor deposition (EB-PVD), high velocity oxy-fuel (HVOF), electrochemical deposition (ECD), electro-spark deposition (ESD), cold spray, and plasma spray coating.

The optional thermal barrier coating 24 is preferred and can be deposited so as to contact directly, or indirectly (e.g., through an intermediate layer, not shown), the top surface of the metallic coating 22 such as, for example, in accordance with the materials and processes disclosed in U.S. Pat. Nos. 6,106,959; 6,231,998; 6,670,046; 6,716,539; and 6,933,060, which are incorporated herein by reference in their entirety.

The airfoil 10 can further comprise one or more auxiliary cooling passages 32 formed (e.g., by drilling, cutting, burning or otherwise forming one or more holes) through the intermediate skin 20, the metallic coating 22 and the optional thermal barrier coating 24 at locations where relatively cooler air inside the near-surface cooling passages 12 can come out and pass over to cool the exterior of the turbine airfoil 10. Such auxiliary cooling passages, not shown, can also be formed (e.g., by drilling, cutting, burning, casting, molding or otherwise forming one or more holes) through the core 14 at locations where relatively cooler air inside core 14 of the turbine airfoil 10 can come out and pass over to cool the exterior of the turbine airfoil 10.

The core 14 is made of, or at least comprises, one or more metallic materials that exhibit a relatively high strength compared to a material used to make the intermediate skin and a material used to make the metallic coating. All or at least part of the core or a core material is less resistant to oxidation and/or less resistant to creep than the intermediate skin, the metallic coating or both. For example, the core can comprise a nickel base superalloy such as, for example, a single crystal nickel base superalloy. It is also contemplated that the core can be made of, or at least comprise, any conventional core material including one or more metallic materials such as, for example, the alloys (CM247), (IN939), (IN738) and (U720Li).

The intermediate skin is not sufficiently thick to survive, without the metallic coating, for a commercially acceptable number of hours (e.g., at least 24,000 hours) at a maximum operating temperature of the turbine airfoil such as, for example, around 1000° C. to 1200° C. The temperature of the gases that the airfoil is exposed to can be much higher (e.g., 1300° C. up to around 1850° C.). At the same time, the intermediate skin is thick enough to withstand the isostatic and/or other pressures needed to diffusion bond the back surface of the skin to the outer surface of the core without the skin deforming into the recessed portion(s) of the core. Such deformation of the skin into the recessed portion(s) can significantly reduce the cross-sectional area of the cooling passages, resulting in an adverse impact on the performance of the airfoil at its maximum operating temperature (e.g., the volume of coolant flowing through the cooling passage(s) is reduced such that the airfoil cannot operate at its intended operating temperature for at least 24,000 hours). It can be desirable for the intermediate skin, made from a suitable metallic material, to have a thickness in the range of from at least about 0.05 mm (50 microns) to about 1 mm (1000 microns), with a preferred thickness in the range of from about 0.2 mm to about 0.5 mm. It has been found that changing the thickness of the intermediate skin can be an easy way to adjust the cooling effectiveness of the coolant passing through the cooling passages. The thinner the intermediate skin, the closer the coolant is to the exterior of the airfoil, and the more effective the coolant can be at cooling the airfoil.

At least the metallic coating, and preferably the intermediate skin as well, is made of or at least comprises a metallic material that exhibits a higher resistance to elevated temperatures and to corrosion than the metallic material of the core. It can be desirable for the metallic coating to have a thickness in the range of from at least about 0.075 mm to about 0.75 mm, with a preferred thickness in the range of from about 0.1 mm to about 0.2 mm.

The intermediate skin 20 can comprise any conventional skin material such as, for example, the metallic skin materials disclosed in U.S. Pat. No. 6,638,639, which is incorporated herein by reference in its entirety. In particular, the intermediate skin 20 can comprise a nickel, cobalt or iron base superalloy. The intermediate skin 20 can also comprise at least one of the alloys Haynes 230, Haynes 214, Haynes 282, Oxide dispersion strengthened (ODS) alloy (PM2000), and Iron base alloy (FeCrAl).

In particular, the metallic coating 22 can comprise the metallic coating materials disclosed, for example, in U.S. Pat. Nos. 6,214,248 and 6,321,449, which are incorporated herein by reference in their entirety. The metallic coating 22 can comprise a metal alloy such as, for example, at least one of the alloys FeCrAlY, NiCrAlY, NiCoCrAlY and CoNiCrAlY. The metallic coating 22 can also comprise other metallic materials (for example reactive element like Re, Ru, Ta or rare earth elements like Nd, Pr, Dy, etc.) that are suitable for the intermediate skin. To reduce mismatch problems (e.g., strain caused by differences in coefficient of thermal expansion and/or thermal conductivity), it can be desirable to use the same or similar alloying materials in the core, intermediate skin and the metallic coating.

When a thermal barrier coating is used, it is desirable for the metallic coating material to function as a bonding or tie layer to facilitate good bonding between the intermediate skin and the thermal barrier coating. Typically, the intermediate skin and the thermal barrier coating will have significantly different coefficients of thermal expansion and/or thermal conductivity. For example, a typical intermediate skin can have a coefficient of thermal expansion of ($\mu$) from 15 to 18, and a typical thermal barrier coating can have a $\mu$ of about 10. In such situations, the metallic coating material is chosen so as to have thermal expansion and conductivity properties that fall between those of the intermediate skin and the thermal barrier coating. In this way the metallic coating reduces the affect of strain changes resulting from the differences in thermal properties between the intermediate skin and the thermal barrier coating.

EXAMPLES

Example 1

An intermediate skin of the high temperature corrosion resistant alloy Haynes 214, having a thickness of about 0.125 mm, was diffusion bonded to the outer surface of a 25 mm thick block of the high strength alloy QM247CC to simulate the bonding of the intermediate skin onto an airfoil core. The block of CM247CC did not include any recessed channels formed in its outer surface. The diffusion bonding was performed by the company Integrated Energy Technologies (IET).

Example 2

An intermediate skin of the high temperature corrosion resistant alloy Haynes 230, having a thickness of about 0.125 mm, was diffusion bonded to the outer surface of a 25 mm thick block of the high strength alloy CM247CC to simulate the bonding of an alternative intermediate skin onto the airfoil core of Example 1. The block of CM247CC did not include any recessed channels formed in its outer surface. The diffusion bonding was performed by the company Integrated Energy Technologies (IET).

As a result of the present invention, near-surface cooled airfoils can be made with near-surface cooling passages that are completely free of any leachable or otherwise sacrificial material (i.e., is free of any sacrificial material) in the recessed portion of the outer surface of the core.

What is claimed is:

1. A method of making a turbine airfoil comprising a near-surface cooling passage, said method comprising:
    providing a metallic core having an outer surface and a recessed portion of the outer surface;
    providing an intermediate metallic skin having a back surface and a top surface;
    bonding the back surface of the intermediate skin to the outer surface of the core such that the recessed portion is enclosed so as to form a near-surface cooling passage, wherein the near-surface cooling passage is formed without the use of a sacrificial material to define the shape of the near-surface cooling passage; and
    depositing a metallic coating of a high temperature-resistant metallic material on the top surface of the intermediate skin.

2. The method according to claim 1, wherein the core being provided includes a plurality of spaced-apart pedestals that extend out from the outer surface of the core and define the recessed portion therebetween.

3. The method according to claim 2, wherein the pedestals each have a top area, and the near-surface cooling passage is formed by bonding the top areas of the pedestals to a corresponding area of the back surface of the intermediate skin such that the skin extends over the recessed portion so as to form said near-surface cooling passage.

4. The method according to claim 1, wherein the core being provided is formed with a plurality of channels having a desired width and depth into the outer surface of the core, which define the recessed portion.

5. The method according to claim 4, wherein areas of the outer surface of the core located on either side of each of the channels is bonded to corresponding areas of the back surface of the intermediate skin such that the skin extends over the channels so as to form said near-surface cooling passage.

6. The method according to claim 1, wherein a plurality of the intermediate skin are provided, where side edges of the intermediate skins are positioned side-by-side and adjacent one another.

7. The method according to claim 1, wherein said bonding comprises:
    positioning the back surface of the intermediate skin and the outer surface of the core opposite to one another, and
    contacting a portion of the back surface of the intermediate skin and a portion of the outer surface of the core so as to form contacting surfaces,
    wherein at least a portion of the contacting surfaces are bonded together.

8. The method according to claim 1, wherein said bonding includes using diffusion bonding, and the intermediate skin being provided is thick enough to withstand the pressures needed to diffusion bond the back surface of the skin to the outer surface of the core without the skin deforming into the recessed portion of the core and significantly reducing the cross-sectional area of the cooling passage, but the intermediate skin being provided is not thick enough to survive 24,000 hours at the maximum operating temperature of the turbine airfoil without the metallic coating.

9. The method according to claim 1, wherein the outer surface of the core being provide has a curved contour, and said method further comprises:
   deforming the intermediate skin so as to conform to the curved contour of the core, and then performing said bonding.

10. The method according to claim 1, wherein the outer surface of the core being provide has a complex three-dimensional curved contour, and before said bonding, said method further comprises:
   deforming the intermediate skin so as to conform to the complex three-dimensional curved contour of the core and such that a portion of the back surface of the intermediate skin contacts a portion of the outer surface of the core.

11. The method according to claim 1, further comprising:
   forming an auxiliary cooling passage through the intermediate skin, the metallic coating and the thermal barrier at locations where relatively cooler air inside the turbine airfoil can come out and pass over to cool the exterior of the turbine airfoil.

12. A turbine airfoil comprising:
   a metallic core having an outer surface and a recessed portion of the outer surface;
   an intermediate metallic skin having a back surface and a top surface, the back surface of said intermediate skin being bonded to the outer surface of said core such that said recessed portion is enclosed so as to form a near-surface cooling passage, a thickness of said intermediate skin being thick enough to withstand pressures needed to bond the back surface of said intermediate skin to the outer surface of said core without a sacrificial material in the recessed portion and without said intermediate skin significantly deforming into the recessed portion of said core and significantly reducing the cross-sectional area of said near-surface cooling passage; and
   a metallic coating of a high temperature-resistant metallic material deposited on the top surface of said intermediate skin.

13. The airfoil according to claim 12, wherein at least part of said core is less resistant to oxidation, to creep or to both than at least one of said intermediate skin and said metallic coating.

14. The airfoil according to claim 12, wherein said intermediate skin is not thick enough to survive, without said metallic coating, for at least about 24,000 hours at a maximum operating temperature of said turbine airfoil.

15. The airfoil according to claim 12, wherein said intermediate skin has a thickness in the range of from at least about 0.05 mm to about 1 mm.

16. The airfoil according to claim 12, wherein said core forms part of a blade, vane, shroud, combustor or duct of a turbine engine.

17. The method according to claim 1, wherein said bonding comprises bonding the back surface of the intermediate skin to the outer surface of the core outside of the recessed portion such that intermediate skin extends substantially fully over the recessed portion, whereby the recessed portion is enclosed so as to form a near-surface cooling passage.

18. The airfoil according to claim 12, wherein:
   the back surface of said intermediate skin is bonded to the outer surface of said core outside of said recessed portion; and
   said intermediate skin extends substantially fully over said recessed portion to enclose said recessed portion.

19. A method of making a turbine airfoil comprising a near-surface cooling passage, said method comprising:
   providing a metallic core having an outer surface and a recessed portion of the outer surface, the core including spaced-apart pedestals that extend out from the outer surface of the core and define the recessed portion therebetween, each of the pedestals including a top area;
   providing an intermediate metallic skin having a back surface and a top surface;
   bonding the top areas of the pedestals to corresponding areas of the back surface of the intermediate skin such that the skin extends over the recessed portion so as to enclose the recessed portion to form a near-surface cooling passage, wherein the near-surface cooling passage is formed without the use of a sacrificial material to define the shape of the near-surface cooling passage; and
   depositing a metallic coating of a high temperature-resistant metallic material on the top surface of the intermediate skin.

20. The method according to claim 19, wherein a thickness of the intermediate skin being thick enough to withstand pressures needed to bond the back surface of the intermediate skin to the top areas of the pedestals without the intermediate skin deforming into the recessed portion of the core and significantly reducing the cross-sectional area of the near-surface cooling passage.

* * * * *